United States Patent

Black

[15] 3,676,307
[45] July 11, 1972

[54] PERCOLATOR DISTILLATION SYSTEM

[72] Inventor: Charles A. Black, Rockfield, Ky.

[73] Assignee: Detrex Chemical Industries, Inc., Detroit, Mich.

[22] Filed: May 8, 1969

[21] Appl. No.: 823,038

[52] U.S. Cl. ..............................203/20, 203/39, 68/18 C, 210/167, 210/175
[51] Int. Cl...................B01b 1/02, D06f 29/00, B01d 19/02, B01d 35/18
[58] Field of Search ...............................202/168–170, 175, 202/176; 203/20, 39; 68/18 C; 159/31, 27, 2, 1 C; 210/167, 175

[56] References Cited

UNITED STATES PATENTS

| R19,090 | 2/1934 | Halsey | 62/497 |
|---|---|---|---|
| 1,791,441 | 2/1931 | Bertsch | 62/496 |
| 2,400,137 | 5/1946 | Reid, Jr. | 62/475 |
| 2,402,940 | 7/1946 | Berry et al. | 252/361 |
| 2,494,978 | 1/1950 | McNeely | 62/497 |
| 2,615,311 | 10/1952 | McNeely et al. | 62/497 |
| 755,179 | 3/1904 | Smith | 202/190 |
| 1,433,040 | 10/1922 | Sandberg | 159/27 X |
| 1,872,554 | 8/1932 | Badger | 159/47 |
| 2,254,538 | 9/1941 | Newman | 202/189 |
| 2,224,025 | 12/1940 | Sondermann | 202/175 |
| 2,274,802 | 3/1942 | Mills | 202/53 |
| 2,574,587 | 11/1951 | Parnes et al. | 126/383 |
| 3,177,126 | 4/1965 | Charreau | 68/18 C |

*Primary Examiner*—Norman Yudkoff
*Assistant Examiner*—J. Sofer
*Attorney*—Paul & Paul

[57] ABSTRACT

A system is disclosed wherein a liquid solvent, susceptible of foaming, is heated within a confined volume and thereby raised to a high pressure, causing same to rise through a vertical stand pipe and be ejected into an unconfined volume of lower pressure, whereupon the solvent is partially vaporized. The unvaporized solvent is caused to impact against a deflector, such impacting in combination with the lower pressure acting to maintain the solvent in a foamless state. It is then channeled through an accumulator prior to re-distillation.

7 Claims, 3 Drawing Figures

INVENTOR.
Charles A. Black

INVENTOR.
Charles A. Black 3,676,307

PERCOLATOR DISTILLATION SYSTEM

BACKGROUND OF THE INVENTION

1. Field of the Invention

This invention lies in the field of systems for the purification and recovery of a solvent from a contaminated solvent solution and, more particularly, such systems which include the distillation of contaminated solvents having a propensity to foam.

2. Description of the Prior Art

Commercial dry cleaning machines utilize solvents such as trichloroethylene and perchloroethylene which constitute the active agents in the cleaning process. Such solvents are expensive and consequently must be recycled and reused a large number of times for economical operation. However, insomuch as the end product of the cleaning process is the removal of dirt, oils, and other insolubles, the reuse of such solvents requires that they be continuously purified. An initial approach to this purification problem is to use mechanical filters which would trap out such insolubles. However, such a solution has the obvious drawback that the filters become clogged and laden with the removed insolubles, and that the solvent, then, is passed through such contaminated filter, with the result that purification efficiency is vastly reduced after a minimum number of circulations of the solvent. An approach which corrects the drawback of mechanical filters is that of distilling the solvent, condensing the heated vapors, and filtering out the oils and insolubles which remain. Accordingly, elaborate distillation systems have been devised incorporating conventional distillation design, including pumping means for circulating the solvent throughout the system. However, the solvents typically used in the dry cleaning process have a high propensity to foam, and the process of raising the solvent to a high temperature and distilling off vapors generally results in a foam column within the distillation chamber which contaminates the vapor. Most equipment commonly in use for this purpose can prevent such contamination of the solvent distillate only by drastically reducing the heat input and the consequent vapor generation so as to allow the foam column to be reduced. This procedure results in a limited and nonuniform vapor generation rate which in turn imposes limitations on the overall system capacity. In addition, the continuous changing and controlling of the heat input introduces system inefficiencies.

SUMMARY OF THE INVENTION

The primary object of this invention is to provide a system capable of maintaining a maximum and uniform solvent distillation rate during the purification and recovery of foaming or non-foaming solutions.

Another object of this invention is to provide a distillation system for the purification and recovery of foaming solutions which restricts the generation of foam which would otherwise contaminate the vapor distillate.

Another object of this invention is to provide a means of separating and collecting suspended insolubles from solvent-oil solutions in a manner that avoids the contamination of the purified distillate.

Another object of this invention is to provide a system for recovery of purified solvent solutions at a continuous and uniform rate and with improved efficiency.

A further object of this invention is to provide a solvent recovery system wherein the circulation of the solvent is powered by the pressures generated by a percolator still.

Accordingly, this invention provides a novel and effective distillation system capable of efficiently operating on solvents having a high foaming characteristic. The system is powered by a percolator still within which the contaminated solvent is raised to a high pressure, which pressure causes the liquid solvent to rise with force through a centrally located stand pipe, and to be ejected through an orifice at the upper end of said pipe. Upon release into an area of lower pressure, some vaporization of the liquid occurs. The remaining liquid which is non-vaporized is driven against a deflector plate whereby the force of the impact against such deflector plate cooperates with the drop in pressure to rupture foam bubbles and restrict the build-up of foam. The vaporized solvent is conducted through a condenser and recirculated by gravity flow through the system. The non-vaporized solution is channeled into a collector where the insolubles are captured, with the fluid spilling out and re-entering the pressure chamber where percolation and distillation is continually repeated. The upward flow from the pressure area creates a suction which draws contaminated solvent into such pressure area, thereby powering recirculation of the liquid solvent throughout the entire system.

DESCRIPTION OF THE PREFERRED EMBODIMENT

Figure 1:
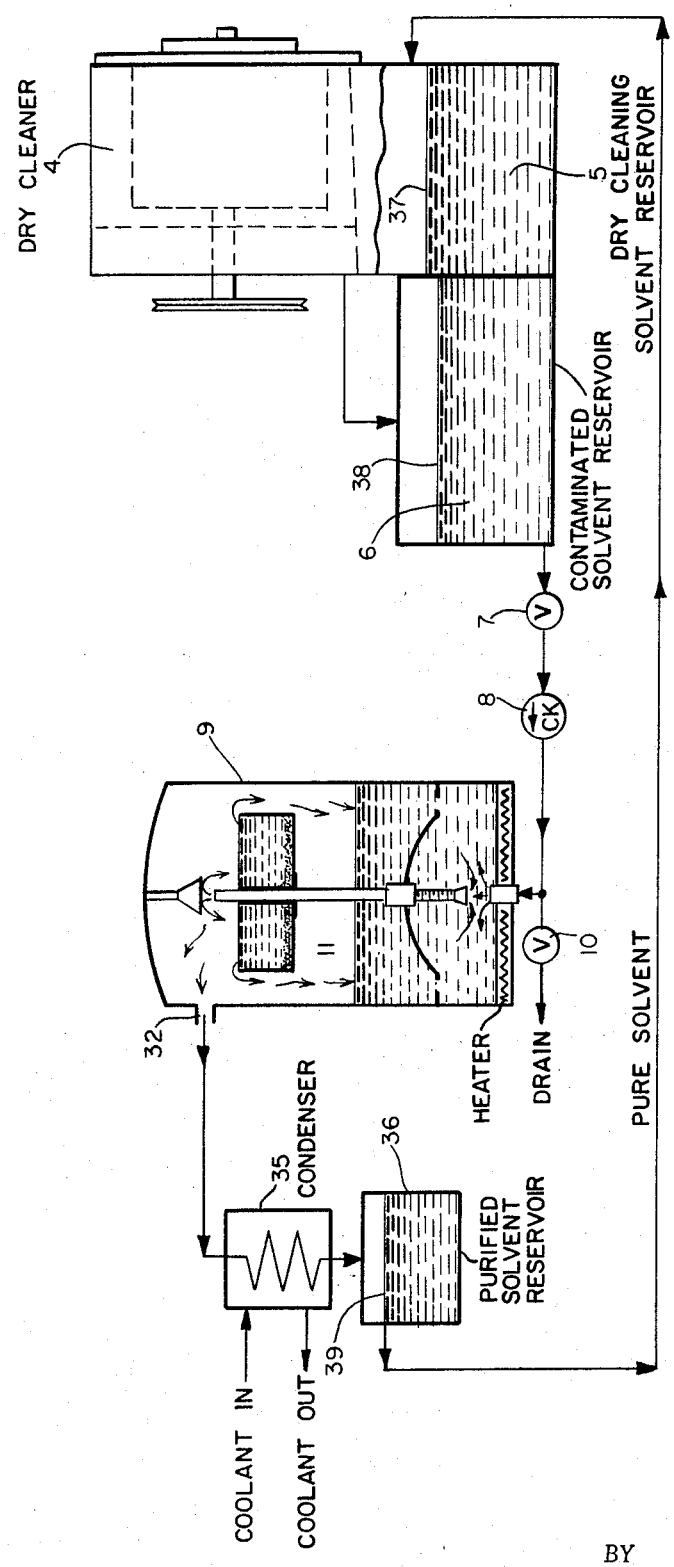
FIG. 1 depicts in block diagram form the entire purification and recovery system.

Referring now to the drawing, FIG. 1 is a schematic diagram showing the flow of solvent through the entire system. The dry cleaning unit 4, having a solvent reservoir 5, is a conventional machine utilizing a solvent such as trichloroethylene or perchloroethylene as the active cleaning agent. Such solvent, after use in the dry cleaning unit 4 and consequent contamination, is gravity fed to a second solvent reservoir 6. It is then conducted through a system of piping, through a valve 7 and a check valve 8 to the lower section of a percolator still 9, being of cylindrical shape and metal construction. The manner of drawing the contaminated solvent into the still 9 is described in detail below. Another valve 10 is provided as a drain for the percolator still 9.

Figure 2:
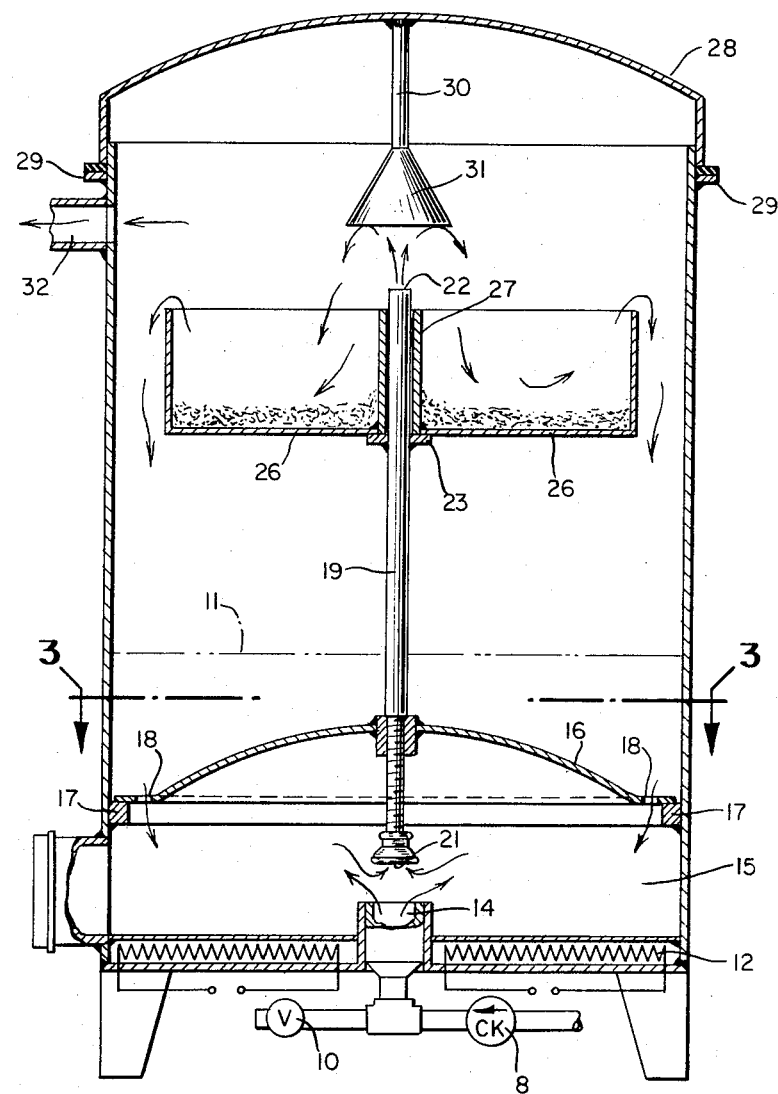
FIG. 2 is a side elevational view of the percolator still.

The construction and operation of percolator still 9 is seen in more detail in FIG. 2. The solvent enters through an opening 14 into a confined chamber 15 of the still 9. Said chamber is confined by the walls and the base of the still 9 and, on the upper side, by an inverted dish 16 fitting closely to the inside walls of the metal still. Operating on chamber 15 is a heat source 12 which is any conventional heating unit such as a steam coil, steam jacket, or electric heating elements. The inverted dish 16 rests on a smooth flange 17 attached closely to the walls of the still 9. The dish diameter is slightly less than the inside diameter of the still in order that it might be easily removable. The dish 16 is convex upward, except for a flat portion at the outer edge thereof which rests upon the flange 17. Such flat portion contains small holes 18 which allow the liquid solvent above the dish to flow down into the lower confined portion.

Figure 3:
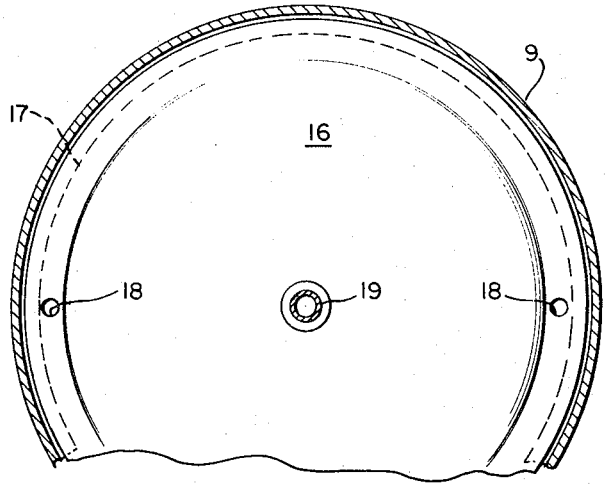
FIG. 3 is a cross-sectional view on the line 3—3 of FIG. 2, which shows the inverted dish plate, its relation to the outer walls of the percolator still, and the location of the stand pipe.

FIG. 3, showing a cross-sectional view of the inverted dish along line 3—3 of FIG. 2, further illustrates the location of the outer flat edge with respect to the curved portion of the dish. It also shows the slight clearance between the outer edge of the flat portion and the walls of the still 9, as well as the manner in which the dish seats upon the flange 17. The locations of the holes 18 are also shown.

Connected to and supported by the inverted dish plate 16 is a stand pipe 19. The preferred embodiment shown utilizes a full pipe coupling continuously welded centrally through the apex of the inverted dish 16. The vertical stand pipe is threaded and screwed into this fitting to make a liquid-tight joint. The threads 20 are indicated in FIG. 2. The stand pipe 19 has an input opening 21 at the bottom thereof, which extends into the pressure chamber 15, and an output orifice 22 at the top thereof. Mounted just below the top of stand pipe 19, positioned above the liquid level 11, and resting on an annular ring 23 affixed thereto, is a dirt trap or accumulator 26. The trap is cylindrical in form and open only at the top. It is constructed with a vertical sleeve 27 having sufficient clearance to easily slide over the top of the stand pipe 19. It is thus removable from the stand pipe when the still 9 is open at the top.

Still referring to FIG. 2, the percolator still 9 is covered at the top by a removable cover 28 which is supported by a flange 29. A vertical rod 30 is attached at the apex of cover 28 so as to extend centrally downward into the still 9 when the cover is in position. Attached to the lower end of vertical rod 30 is a liquid deflector 31 which is suspended at an elevation above the upper discharge orifice 22 of stand pipe 19 so as to be in position to deflect the liquid solvent discharged therefrom downward and into the removable accumulator 26. The deflector 31 is of conical form having an outer rim diameter sufficient to collect and deflect all of the liquid discharged from stand pipe 19. It can be constructed of any suitable metal which will withstand the pressure of the fluid which impinges upon it. Also seen at the upper left of FIG. 2 is a vapor outlet connection 32 through which distilled vapors pass.

Referring again to FIG. 1, the flow diagram indicates that, in the preferred embodiment, the vaporized solvent passes out of the vapor outlet connection 32 and is introduced into a condenser or equivalent recovery device 35. Such condenser is a conventional unit in which the vaporized solvent is reduced to liquid form. It is then passed into a purified solvent storage vessel 36 which is coupled by piping to the dry cleaning reservoir 5.

The operation of the device is as follows:

The contaminated solvent in the dry cleaning system is allowed to rise in the body of the still 9 to a level above the inverted dish plate 16, as indicated by line 11. When heat is applied by heat source 12, the liquid in the confined chamber 15 below the inverted dish 16 is raised to a high temperature and pressure. The pressure of the liquid is exerted against the underside of the inverted dish 16, as well as against the liquid above same. Such pressure forces a flow of hot liquid up stand pipe 19 and through the outlet 22, this being a release path to the lower pressure portion of still 9. When the hot liquid is emitted through outlet 22, it emerges with sufficient temperature that some of the liquid (solvent) is caused to vaporize. The vaporized solvent is conducted through the vapor outlet connection 32 from where it proceeds to the condenser 35. That portion of the liquid which is not vaporized is emitted from stand pipe 19 with momentum which carries it against deflector plate 31, which is positioned to deflect the solvent downward into the removable accumulator 26. The emitted liquid will, generally, contain particles and other insolubles derived from the dry cleaning process. These insolubles, upon reaching the accumulator 26, tend to settle out of the liquid and are thereby trapped. The accumulator cylinder 26 fills with the liquid solvent to the point where it over-flows, the solvent then returning by gravity to level 11, and thence through the holes 18 to the pressure chamber 15 for recycling. When sufficient insolubles are accumulated in accumulator 26 to fill same, it can be removed by opening up the removable cover 28 and lifting it out for cleaning.

In the process as described hereinabove, the important foam-destroying action takes place at the point where the liquid is discharged from stand pipe 22 and driven against deflector 31. As has been pointed out previously, the solvents used in dry cleaning systems have a high propensity to foam, especially when heated. When the liquid is expelled from opening 22, there is foam associated with it as a result of the heating process. That portion of the liquid which immediately vaporizes, of course, carries no foam with it in its vaporized state. The foam present in the contaminated liquid which strikes deflector 31 is broken up by the impact, the bubbles bursting due to the impact. In addition, the reduced pressure at the upper portion of the still 9 creates a condition conducive to bubble bursting, the pressure within the bubble being greater than that without. This phenomenon is similar to that observed when a bubble ascends into the air. At the elevation where it is formed, pressure within equals that without. But, as it rises, the outside pressure falls, and the bubble bursts. An important facet of this invention, then, lies in the technique of conducting the foaming solvent into an area of reduced pressure, where the simultaneous combination of such reduced pressure and impact against the deflector acts to destroy the foam. Thus, a liquid solution that tends to build a column of foam when heated, is distilled without producing the foam which otherwise would permeate the vapor space in the upper portion of the still 9 to a point where it would contaminate the clean vaporized solvent.

Referring again to FIG. 1, the entire system operation is as follows:

Contaminated liquid solvent is drawn into the lower section of the percolator still 9. The force drawing the liquid in through opening 14 is a suction force created by the upward flow of heated solvent through stand pipe 19. That portion of the solvent which is vaporized passes out through vapor outlet 32 into the condenser 35, where it is transformed and discharged in liquid form into the storage tank 36. Tank 36 contains purified liquid solvent at a sufficiently high level 39 such that the remainder of the system can be gravity fed. From tank 36, the solvent passes, under a pressure head, into the dry cleaning reservoir 5, thence through the machine 4 and into the contaminated liquid tank 6. It is to be noted, as shown in FIG. 1, that the level 37 of reservoir 5 exceeds the level 38 of reservoir 6, the difference in levels providing the pressure by which the liquid is transmitted through the dry cleaning unit 4. From tank 6, the liquid passes through piping to opening 14 where it is drawn by suction, as described above, into the still 9. The check valve 8 acts to prevent the liquid from flowing back from the still 9 to the storage tank 6. Due to the foam-destroying arrangement embodied in this invention, there is no need to control the rate of heating and vapor generation. The overall system rate of circulation can be established in accordance with user needs, and it will be maintained uniformly.

Although this invention has been described with specific reference to a preferred embodiment as indicated in the drawings, it is to be noted that modifications and changes of elements of the system can be made within the spirit and scope of the invention. Although one feature of the embodiment as described is the effective pumping action caused by the rising hot liquid through the stand pipe 19, such pumping action providing the energy to circulate the solvent through the entire system, in particular applications it will be desired to introduce conventional pumping means at one or more points in the system to regulate the solvent pressure. Further, although this system has been described as a combination, an element of which embodys a dry cleaning unit, it is to be appreciated that the system could be applied to any application requiring purification of any contaminated liquid. Accordingly, the system elements are of a size and construction suitable to the particular application.

The heating means 12, although shown in the preferred embodiment as a heating coil placed beneath chamber 15, could be any suitable heating means, placed beneath, about or in chamber 15. Further, modifications may be made to accumulator 26, such as a screen or other direct drainage means through the bottom of same.

What is claimed is:

1. A system for purifying contaminated liquid, and for recovering such liquid in a purified state, which system operates upon a liquid-contaminating unit, through which such liquid is circulated, comprising:
   a. first storage means, to store said liquid prior to utilization in said liquid-contaminating unit;
   b. second storage means, to accumulate said liquid after utilization in said liquid-contaminating unit;
   c. pressure generator means, to operate upon liquid drawn from said second storage means, whereby to raise same to an increased temperature and pressure;
   d. percolator means, whereby fluid from said pressure generator means is ejected into an area of lower pressure where some of said fluid vaporizes;

e. deflector means, against which said ejected fluid impacts, and which deflects downward the liquid which is not vaporized upon ejection from said percolator means;

f. accumulator means, located below said deflector means, to filter out impurities and insolubles in said contaminated liquid which is not vaporized upon ejection from said percolator means;

g. percolator still means, constituting an enclosed chamber housing said pressure generator means, said percolator means, said deflector means, and said accumulator means, wherein said pressure generator means are located at the bottom thereof and said percolator means provide a flow path from said pressure generator means to the upper portion of said percolator still means, being said area of lower pressure, said lower pressure cooperating with said impact against said deflector means to destroy foam associated with said fluid;

h. recovery means, to transform said some of said fluid which vaporizes, from a gaseous state to a liquid state;

i. third liquid storage means, to accumulate the liquid output of said recovery means, said storage means maintaining said liquid at a pressure greater than that of the liquid in said first storage means;

j. coupling means, providing flow from said first storage means through said liquid-contaminating unit and thence to said second storage means, from said second storage means to said percolator still means, coupling the vapor output of said percolator still means to said recovery means, coupling the liquid output of said recovery means to said third liquid storage means, and coupling liquid from said third storage means to said first storage means.

2. A system in accordance with claim 1 wherein said pressure generator means is comprised of:

a. a confined volume within said percolator still means enclosed by the walls and floor thereof and by an inverted dish fitting closely to the inside walls of said percolator still means, which inverted dish forms the upper surface of said pressure generator means and has a plurality of small holes near the outer periphery thereof, and b. heating means, whereby to provide heat energy to the liquid contained within said confined volume so as to raise the temperature and pressure of the liquid therein.

3. The invention as described in claim 2 wherein said percolator means is composed of a stand pipe, arranged vertically in the center of said percolator still means, having an open end thereof below said inverted dish and within said confined volume, and a second open end at the top thereof, which top extends into the upper portion of said percolator still means.

4. The invention as described in claim 3 wherein said accumulator means is composed of a cylinder affixed to the upper portion of said vertical stand pipe, being open only at the top thereof.

5. The invention as described in claim 4 wherein said deflecting means is a deflecting surface suspended from the top of said percolator still means and situated directly above the upper opening of said stand pipe, thereby to catch and deflect liquids emitted from said stand pipe downwardly into said accumulator means.

6. Percolator distillation means for purifying a foaming liquid, comprising:

a. a percolator still having side walls and a floor;

b. a pressure generator within said percolator still for bringing said liquid to an elevated temperature and pressure, said pressure generator enclosed by the walls and floor of said percolator still and by an inverted dish having a flat outer periphery containing a plurality of small holes, which inverted dish fits closely to the walls of said percolator still and forms the upper surface of said pressure generator;

c. heating means, for providing heat energy to the liquid contained within said pressure generator so as to raise the temperature and pressure of such liquid;

d. a vertical transmission pipe having a lower opening within said pressure generator and an upper opening outside of and above said pressure generator, through which said liquid at said elevated temperature and pressure is free to rise and to be emitted from the upper opening thereof;

e. a metal deflector positioned above said upper opening; and f. an accumulator closed on the bottom and positioned below said deflector and above said pressure generator, wherein the liquid which rises through said vertical pipe is ejected into an area of said percolator still having a relatively low pressure such that some of said ejected liquid vaporizes, and the remainder liquid is caused to strike said deflector causing an impact of such liquid against said deflector, the combination of said impact and said reduced pressure acting to destroy any foam associated with said liquid, said deflector positioned to direct said remainder liquid downward into said accumulator, the overflow from which falls and collects in said still above said inverted dish, liquid returning to said pressure generator through said small holes under equilibrium pressure conditions within the still.

7. The invention as described in claim 6 wherein said percolator distillation means is an element of a system for purifying a foaming liquid which is processed through a liquid-contaminating unit wherein it is contaminated, which system includes:

a. first storage means, to store said liquid prior to utilization in said liquid-contaminating unit;

b. second storage means, to accumulate said liquid after utilization in said liquid-contaminating unit;

c. recovery means, to transform said some of said fluid which vaporizes, from a gaseous state to a liquid state;

d. third liquid storage means, to accumulate the liquid output of said recovery means, said storage means maintaining said liquid at a pressure greater than that of the liquid in said first storage means;

e. coupling means, providing flow from said first storage means through said liquid-contaminating unit and thence to said second storage means, from said second storage means to said percolator still, coupling the vapor output of said percolator still to said recovery means, coupling the liquid output of said recovery means to said third liquid storage means, and coupling liquid from said third storage means to said first storage means.

* * * * *